United States Patent [19]
Cook et al.

[11] 3,807,840
[45] Apr. 30, 1974

[54] FILM HANDLING CASSETTE HAVING REEL LOCKING MEANS

[75] Inventors: Gerald H. Cook, Lynnfield; Melvin Friedman, Sudbury, both of Mass.

[73] Assignee: Polaroid Corporation, Cambridge, Mass.

[22] Filed: Jan. 3, 1972

[21] Appl. No.: 214,735

[52] U.S. Cl. .................. 352/72, 242/198, 352/130
[51] Int. Cl. ........................................... G03b 23/04
[58] Field of Search ........... 242/198, 199, 200, 197, 242/54.1, 68.3, 71.2, 71.1; 179/100.2 Z; 352/72, 130

[56] References Cited
UNITED STATES PATENTS

| | | | |
|---|---|---|---|
| 2,401,632 | 6/1946 | Greenleaf | 242/54.1 |
| 2,550,556 | 4/1951 | Haloski | 242/54.1 |
| 3,604,790 | 9/1971 | Land et al. | 242/199 |
| 3,692,956 | 9/1972 | Northrup | 242/199 |
| 3,686,470 | 8/1972 | Stahlberg et al. | 179/100.2 Z |

FOREIGN PATENTS OR APPLICATIONS 1,099,755   2/1961   Germany .................. 242/198

Primary Examiner—George F. Mautz

[57] ABSTRACT

A multi-purpose photographic film handling cassette and a motion picture camera and projector or viewer with which the cassette is adapted to be used for exposing, processing, and projecting a photographic film strip stored within the cassette. The cassette includes reel locking devices for arresting the rotation of supply and take-up reels mounted therein when the cassette is not operatively associated with either the camera or projector. Provisions are made for automatically unlocking the reels in response to locating the cassette in the cassette receiving chamber of the camera. In the viewer, the reels are unlocked by axial displacement of elements of the viewer after the cassette is located in the cassette receiving chamber of the viewer. The reel unlocking elements of the camera and viewer may be integrally formed with the reel drive shafts of those apparatus.

4 Claims, 9 Drawing Figures

PATENTED APR 30 1974 3,807,840

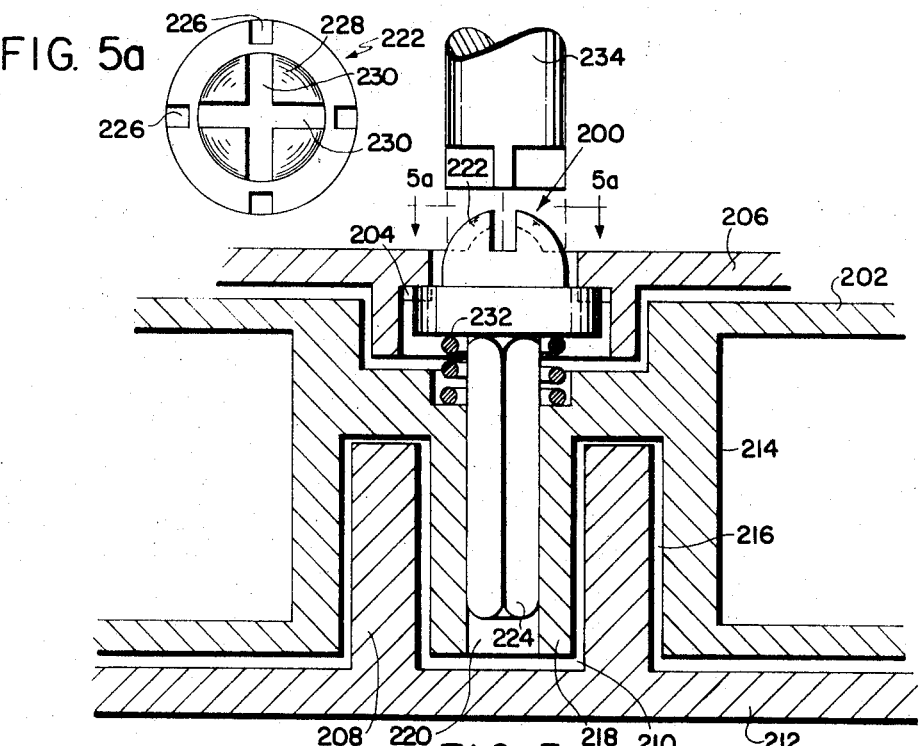
FIG. 5a
FIG. 5
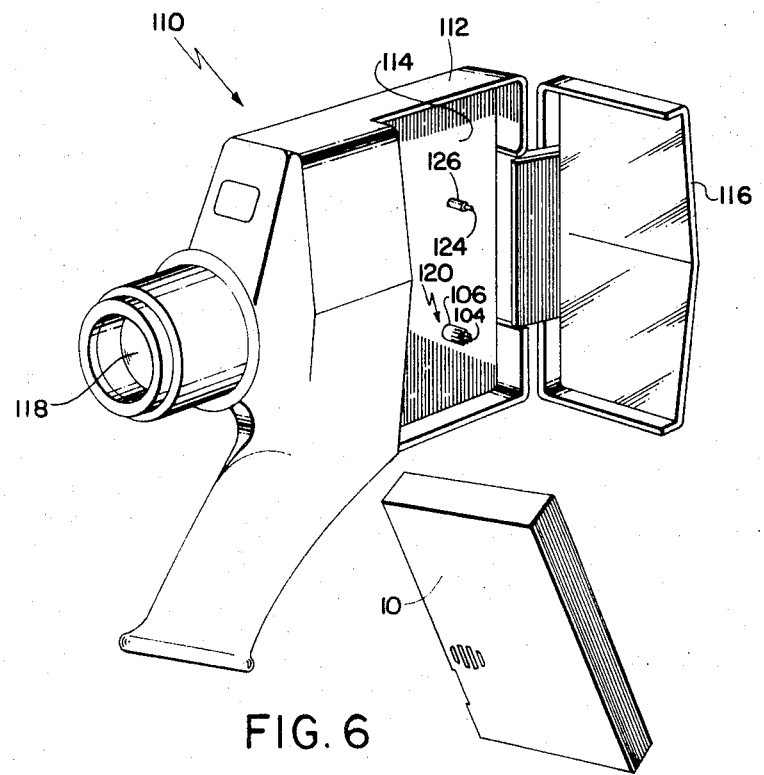
FIG. 6

FILM HANDLING CASSETTE HAVING REEL LOCKING MEANS

BACKGROUND OF THE INVENTION

1. Field of the Invention

The present invention relates to the field of photography and, more particularly, to film handling systems featuring a multi-purpose film handling cassette which includes supply and take-up reel locking devices.

2. Description of the Prior Art

Self-developing motion picture film handling systems have recently been developed which feature a multi-purpose film handling cassette adapted for use with a motion picture camera and projector or viewer for exposing, processing, and projecting a length of photographic film strip without having to remove the film strip from the cassette.

The cassette comprises a housing for enclosing supply and take-up reels having a length of unexposed film strip coupled therebetween, a combination exposure and projection station providing access to the film strip for exposure and projections, and a processing station for treating the photosensitive emulsion on one side of the film strip with a liquid processing composition.

In operation, the cassette is mounted in the motion picture camera and the film strip is advanced from the supply reel through the exposure station, where it is subjected to image bearing light, and then onto the take-up reel. The cassette may then be transferred to a motion picture projector for processing and projection. During the initial rewind of the film strip from the tape-up reel to the supply reel, it passes through the processing station and is coated with the liquid processing composition for developing latent images in the exposed photosensitive emulsion. Development takes in a relatively short period of time so that almost immediately after rewind, the film strip may be advanced through the projection station for viewing. Exemplary of such new and unique systems are those described in U. S. Pat. No. 3,615,127 issued to Edwin H. Land on Oct. 26, 1971; U. S. Pat. No. 3,597,062 issued to Rogers B. Downey on Aug. 3, 1971; and U. S. Pat. No. 3,537,784 issued to Rogers B. Downey on Nov. 3, 1970, all of which are assigned to the same assignee as the present invention.

It is desirable to provide such cassettes with some means for locking or arresting the rotation of the supply and take-up reels when the cassette is not operatively associated with the camera or projector to prevent the film strip from uncoiling and becoming disoriented with respect to its path of travel through the cassette housing. More importantly, by restricting slack in film strip, it is restrained from extending outwardly from the cassette housing through the access opening at exposure and projection station thereby substantially reducing the possibility of damage to the film strip as the cassette is inserted into the camera or projector.

Because the multi-purpose cassette includes a processing composition dispenser and associated structure for activating and deactivating the dispenser, the amount of space available within the cassette housing for accommodating the reel locking structure is severely limited. Therefore, it is desirable to provide a reel locking system which is compact and may be incorporated into the cassette without increasing its dimensions.

It is also desirable to provide a reel locking system which is designed to automatically unlock the reels in response to locating the cassette in the camera or projector and also automatically lock the reels in response to withdrawing the cassette therefrom. This feature serves to simplify the operation of the film handling system and minimize the number of mental steps required of the user. Again, it is preferable to provide compact and simple reel locking system actuating devices within the camera and projector which do not require an increase in the dimensions of the camera and projector.

The prior art discloses a number of cassettes including reel locking systems for arresting the rotation of supply and take-up reels which are adapted to hold an elongated web of material.

Typically, these systems require axial displacement of the reels between locked and unlocked positions and/or various locking cams, brakes, and pins disposed around or between the periphery of the reels or between the cassette side walls and the reel guide flanges. Obviously, the incorporation of such reel locking systems into a multi-purpose film handling cassette would substantially increase its dimensions and add to its complexity. For examples of prior art cassettes which include reel locking systems, reference may be had to U. S. Pat. Nos. 2,922,642; 1,081,926; and 3,523,656.

SUMMARY OF THE INVENTION

The present invention provides a multi-purpose film handling cassette which includes supply and take-up reels, reel bearings for rotatably mounting the reels within the cassette, and reel locking devices for arresting rotation of the reels when the cassette is not operatively associated with a camera or projector.

Advantageously, the reel locking devices are coaxially disposed with the reels and reel bearings such that they occupy a minimum amount of space within the cassette.

In one embodiment, the reel locking devices are operatively associated with the reel bearings and are adapted to be axially displaced from a normal locking position in which the locking devices are engaged with the reel hubs to an unlocking position in which the locking devices are disengaged from the hubs.

In another embodiment, the reel locking devices are operatively associated with the reels and are mounted for axial displacement from a locking position in which they engage detents within the cassette to an unlocking position in which they are disengaged from the detents.

A motion picture camera and projector are provided which include locking device actuating members that are adapted to engage the reel locking devices and move them from the locking position to the unlocking position when the cassette is located in a cassette receiving chamber therein. Advantageously, the actuating members may take the form of actuating pins which are preferably associated with camera and projector reel drive or locating shafts.

In both embodiments, the reel locking devices are spring biased towards the locking position and are axially displaced relative to the reels and reel bearings by the actuating pins in response to operatively coupling the reels to their respective drive or locating shafts. Upon removing the cassette from the camera or projector, the biasing springs automatically move the reel locking devices to the locking position.

Therefore, it is an object of the present invention to provide a multi-purpose film handling cassette of the type previously discribed which includes a reel locking device that is coaxially disposed with a reel and means for rotatably mounting the reel within the cassette and is mounted for axial displacement, with respect to the reel and reel mounting means, from a locking position, in which the reel locking device arrests rotation of the reel, to an unlocking position wherein the reel locking device permits rotation of the reel.

It is another object of the present invention to provide a multi-purpose film handling cassette which includes a reel and a reel locking device which is adapted to be moved by an external force applying member from a locking position to an unlocking position when the cassette is located within a camera or projector.

Another object of the present invention is to provide a multi-purpose cassette in which supply and take-up reels within the cassette are automatically locked in response to withdrawing the cassette from an operative position in a camera or projector and are also automatically unlocked in response to locating the cassette at an operative position within the camera or projector and operatively engaging the reels with appropriate drive means.

It is yet another object of the invention to provide a cassette for handling an elongated web of material which includes a reel for holding an elongated web of material, a reel bearing, and a reel locking device coaxially disposed with the reel and reel bearing for axial displacement relative thereto by an external force applying member mounted in an apparatus with which the cassette is adapted to be used from a normal reel locking position to an unlocking position.

Another object of the present invention is to provide a film handling system comprising a multi-purpose film handling cassette including a reel and a reel locking which is movable from a normal reel locking position to an unlocking position in combination with a camera and projector which include a reel locking device actuating member for moving the reel locking device from its locking position to its unlocking position in response to operatively associating the cassette with the camera or projector.

It is still another object of the present invention to provide a motion picture camera and projector which are suitable for use with a multi-purpose film handling cassette of the type including a housing, supply and take-up reels for holding a length of photographic film strip, and reel locking devices for arresting rotation of the reels when the cassette is not operatively associated with the camera or projector.

Other objects of the invention will be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 5 is an enlarged cross-sectional view of a section of a cassette showing an alternative embodiment of a reel bearing, a reel, and a reel locking device located in its locking position;

FIG. 5a is a top view of the reel locking device;

FIG. 6 is a perspective view of a motion picture camera with which the multi-purpose cassette is adapted to be used.

DESCRIPTION OF THE PREFERRED EMBODIMENT

Figure 1:
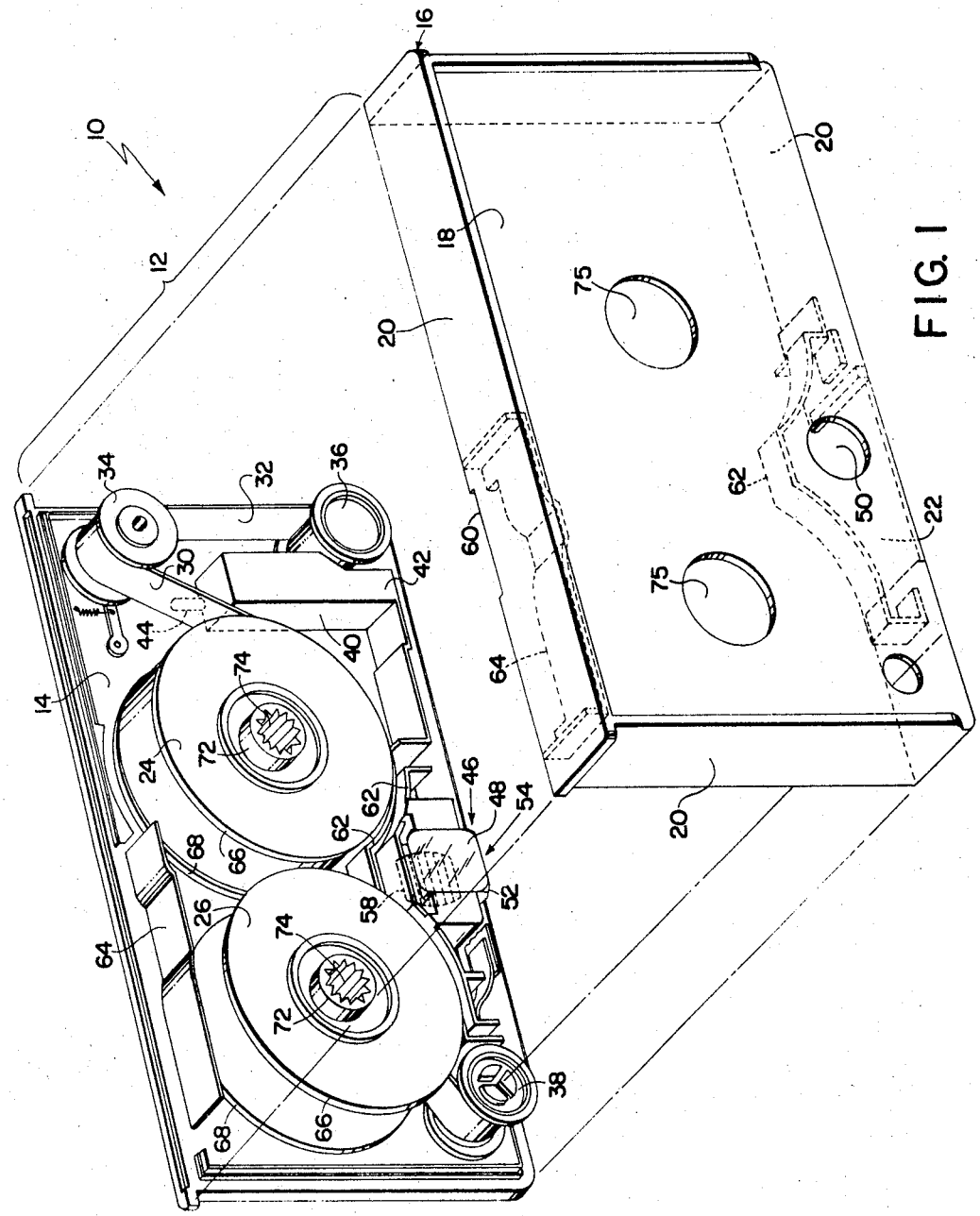
FIG. 1 is an exploded perspective view of a multi-purpose film handling cassette embodying the instant invention showing the construction and location of various cassette components within the cassette housing.

A preferred embodiment of this invention is illustrated as applying a compatible processing fluid to a film structure which comprises both a photosensitive image recording layer and an image receiving layer in which a visible image may be formed by image forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black and white images, a silver halide developer and a silver halide solvent are applied in an aqueous alkaline solution to a photo exposed silver halide stratum or emulsion where they develop exposed silver halide to silver and react with unreduced silver halide to form a soluble silver complex. This complex, in order to form a positive print, is transferred and reduced to silver on a silver receptive stratum on which the silver halide stratum has been superposed. It has generally been the practice, in the completion of this process, to separate the silver receptive and silver halide strata in order to render the positive image visible, particularly, when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver to deposit upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that represents a good image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black and white image which can be viewed by transmitting light without the necessity of removing the processed, negative image containing photosensitive layer are shown in prior U. S. Pat. No. 2,861,885 of Edwin H. Land and which issued on Nov. 25, 1958. Other composite film assemblies capable of producing photographic records which can be exhibited in full color without the necessity of removing the processed photosensitive layer as shown in prior U. S. Patents of Edwin H. Land, No. 2,726,154, issued Dec. 6, 1955 and No. 2,944,894, issued July 12, 1960. All of these prior patents are assigned to the same assignee of the present invention.

However, it should be noted that the present invention is not directed to the chemistry by which visible images are formed in an exposed photosensitive material and/or formed in an image receiving stratum associated therewith. While an illustrative preferred embodiment of the invention is shown applying a compatible processing fluid to a film structure not requiring the removal of the photosensitive layer after visible image formation is completed, the invention itself is also applicable for use with other types of processing fluids and film structures.

Referring now to FIG. 1 of the drawings, a multipurpose film handling cassette is shown generally at 10. Cassette 10 includes a substantially rectangular parallelepiped shaped housing 12 formed by a rectangular base section or side wall 14 for supporting various cassette components and a mating cover 16 for enclosing those components.

Cover 16 includes a rectangular side wall 18 and an integrally formed depending peripheral wall 20 which serves to space side walls 14 and 18 in parallel relation to one another. A generally rectangular opening 22 in peripheral wall 20 serves as a film gate for providing access for light rays to be directed towards incremental sections of a film strip which is adapted to be progressively transported past opening 22 during exposure and projection modes of operation.

Figure 2:
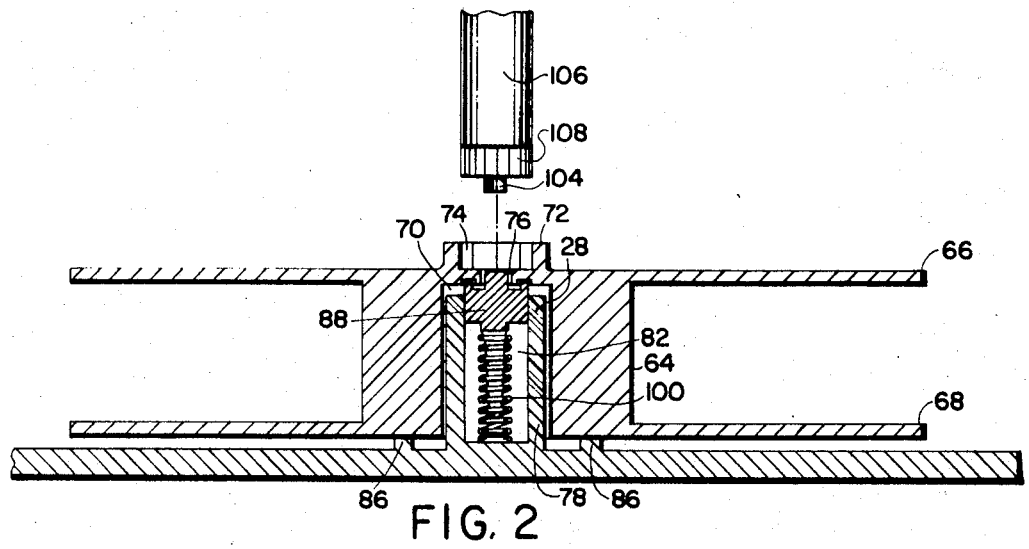
FIG. 2 is an enlarged cross-sectional view of a section of the cassette showing a reel bearing, a reel mounted on the bearing, and a reel locking device located in its locking position.
Figure 3:
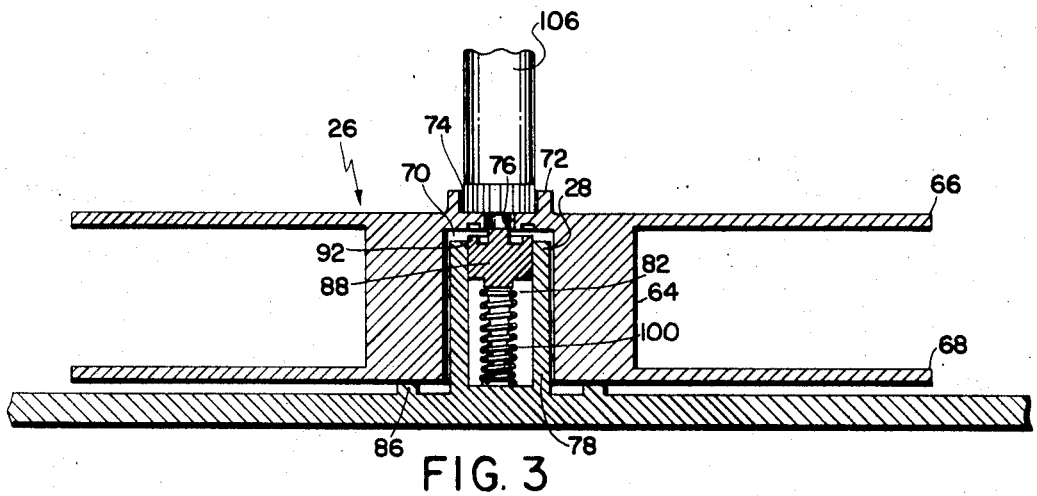
FIG. 3 shows the reel locking device of FIG. 2 in the unlocking position.
Figure 4:
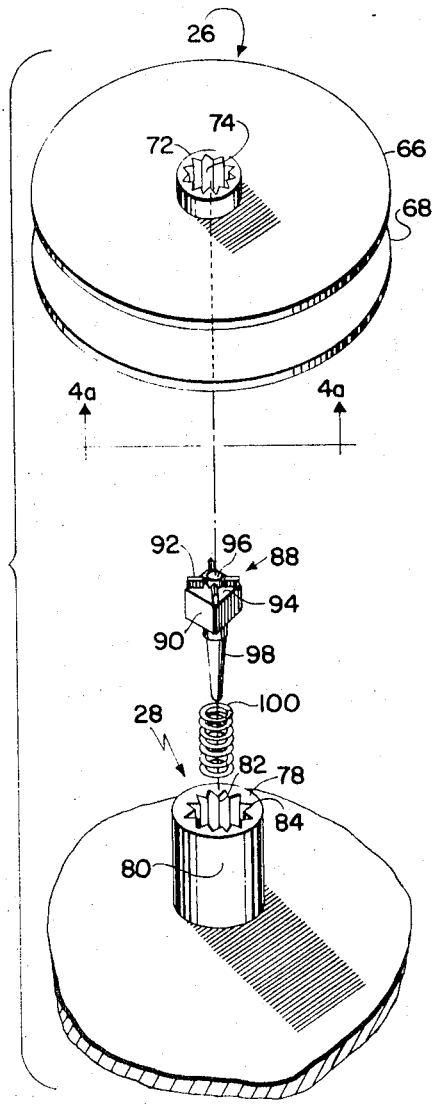
FIG. 4 is an exploded perspective view of a reel, a reel bearing, and a reel locking device.

A supply reel 24 and take-up reel 26 are rotatably mounted on a pair of reel bearings 28 (only one of which is shown in FIGS. 2–4) which are preferably integrally formed with side wall 18 and are disposed such that reels 24 and 26 may be located in side-by-side coplanar relation with their respective axes of rotation substantially normal to side walls 14 and 18. A detailed description of reels 24 and 26, reel bearings 28, and reel locking devices associated therewith will appear later in the disclosure.

Fixedly attached at its ends to supply reel 24 and take-up reel 26 is a length of unexposed film strip 30 of the type previously described. Film strip 30 includes a photosensitive emulsion 32 on one side thereof and conventional sprocket holes (not shown) along one edge thereof which are adapted to be engaged by camera and projector claw mechanisms positioned to extend through opening 22 for progressively transporting incremental sections of film strip 30 past opening 22 during exposure and projection modes of operation.

In traveling from supply reel 24 to take-up reel 26, film strip 30 sequentially passes around idlers or rollers 34, 36, and 38 disposed near three successive corners of side wall 14. As best shown in FIG. 1, rollers 34 and 36 occupy, respectively, the first two corners intermediate supply reel 24 and opening 22 and roller 38 occupies the next successive corner intermediate opening 22 and take-up reel 26.

Initially, the major portion of film strip 30 is stored on supply reel 24 with its photosensitive emulsion side 32 facing outwardly from the supply reel hub thereby passing around rollers 34, 36, and 38 with the emulsion side 32 facing inwardly toward the rollers such that film strip 30 is presented at opening 22 with its emulsion side 32 facing the interior of cassette housing 12. It will be noted that film strip 30 includes a transparent base through which image bearing light may be transmitted to cause exposure of the photosensitive emulsion.

In operation, the cassette is mounted in an appropriate camera (to be described hereinafter) such that opening 22 is aligned with the camera lens and shutter mechanism and film strip 30 is exposed as it is progressively transported past opening 22 onto take-up reel 26. Cassette 10 may then be immediately transferred to a suitable projector (to be described hereinafter) for processing or developing the exposed film strip 30 during its initial rewind from take-up reel 26 to supply reel 24.

As noted earlier, processing is accomplished by coating the emulsion side 32 of the exposed film strip 30 with a liquid processing composition to provide a positive print by a diffusion transfer process. For this purpose, cassette 10 is provided with a normal inoperative processing station formed by a processing fluid dispenser 40 supported by side wall 14 with its lower applicator end 42 located adjacent the path of travel of emulsion side 32 intermediate opening 22 and roller 36. Dispenser 40 includes a container having therein a supply of viscous developing fluid. The lower applicator end 42 includes an orifice which acts as a nozzle for feeding a doctor blade to supply a carefully measured thickness of the viscous film processing fluid to the emulsion side 32 of film strip 30. A rupturable membrane is provided across the orifice to render the dispenser inoperative. Dispenser 40 also includes a plunger 44 which is actuable by means in the viewer to apply pressure to the container during the processing mode of operation. The pressure causes the membrane to rupture thereby permitting the fluid to flow through the orifice and across the doctor blade for application to the film strip as it is transported past the doctor blade during its initial rewind onto supply reel 24. Such a processing system is disclosed in U. S. Pat. No. 3,615,127.

Development is completed in a relatively short time and almost immediately the processed film strip 30 may be transported past opening 22 for projection.

To facilitate projection of film strip 30 at opening 22, cassette 10 is provided with a light-reflecting element which in the preferred embodiment may take the form of a molded plastic prismatic lens 46. As best shown in FIG. 1, lens 46 is mounted on side wall 14 and includes a substantially flat, transparent, light-receiving surface 48 which is aligned with an opening 50 in side wall 18 for receiving light from a projection lamp associated with the projector. The light entering prismatic lens 46 through surface 48 is reflected from an internal reflecting surface (not shown) for changing its direction by approximately 90° and out through a convex transparent surface 52 aligned with opening 22 for projecting the film strip as it is transported past surface 52. Thus prismatic lens 46 and opening 22 cooperate to define a combination exposure and processing station 54 therebetween.

A prismatic lens of this type, suitable for use in connection with the present invention, is described in copending application, Ser. No. 214,591, filed on even date herewith by Philip G. Baker and is assigned to the same assignee as the present invention.

For locating film strip 30 at its proper position for exposure and projection, cassette 10 is provided with a spring biased film pressure plate 56 which is adapted to cooperate with camera and projector aperture plates for accurately positioning film strip 30 with respect to the combination exposure and projection station 54.

To enhance drying of the processed film strip, the cassette is provided with an air inlet 58 formed in side wall 14 behind lens 46 and an air outlet 60 formed in peripheral wall 20. During the processing and/or projection modes of operation, air supplied by an air blower mounted in the projector enters cassette housing 12 through air inlet 58 and flows over a portion of lens 46 thereby cooling the lens which tends to be heated by the projection lamp and heating the incoming air. The air is then directed toward the interior of the housing by baffles 62 which cooperate to form a light sealing and air distributing labyrinth. After flowing across reels 24 and 26 to facilitate film drying, the air is directed by light sealing and air distributing baffles 64 out of housing 12 through air outlet 60.

Turning now to the construction and operation of reels 24 and 26, reel bearings 28, and their associated reel locking devices, attention is directed to FIGS. 2, 3 and 4. For the purpose of illustration, only the take-up reel assembly is shown since for the most part, the supply and take-up reel assemblies are identical. It will be understood that term reel also includes other devices for holding an elongated web of material such as spools, etc.

Take-up reel 26 includes a central hub section 64 and top and bottom guide flanges 66 and 68 integrally formed and coaxially disposed with hub section 64. Hub section 64 is provided with a central smooth bore reel bearing sleeve 70 extending from the interior surface of top flange 66 through the bottom flange 68. Integrally formed with top guide flange 66 and extending upwardly therefrom is a drive shaft coupling member 72 which has a fluted central bore 74 which is accessible through an opening 75 in side wall 18. Centrally located in top flange 66 is opening 76 communicating with coupling member bore 74 and bearing sleeve 70 along their common axis.

As best shown in FIG. 4, the means for rotatably mounting take-up reel 26 within cassette housing 12 includes reel bearing 28. In the preferred embodiment, bearing 28 may take the form of a fixed axle or mounting post 78 which is preferably integrally formed with cassette side wall 14. The mounting post 78 includes a smooth outer surface 80 and is dimensioned to receive reel bearing sleeve 70 as shown in FIGS. 2 and 3 such that bottom reel flange 68 rests atop an annular locating member 86 integrally formed with side wall 14 around post 78. Post 78 also includes a star shaped fluted bore 82 extending from its top end 84 down to a point slightly above the interior surface of side wall 14.

In order to prevent rotation of reel 26 with respect to bearing 28 when the cassette is not operatively associated with the camera or projector, bearing 28 has a reel locking device 88 operatively associated therewith. As best shown in FIG. 4, locking device 88 is coaxially disposed with reel 26 and reel bearing 28 and includes a section 90 which is substantially square in cross section.

Section 90 includes four inverted V-shaped detents 92 integrally formed with and extending above its top surface 94. Detents 92 are symmetrically disposed about a centrally located protrusion 96 and terminate at the four corners of section 90. Integrally formed with the bottom of section 90 and extending downwardly therefrom is a tapered post 98 for receiving a locking device biasing spring 100.

As best shown in FIGS. 2 and 3 locking device 88 and spring 100 are most advantageously disposed within the star-shaped bore 82 of mounting post 78. Section 90 is dimensioned such that its four corners extend into the points of the star flutes thereby preventing rotation of device 86 with respect to post 79 but permitting axial displacement relative thereto.

Figure 4A:
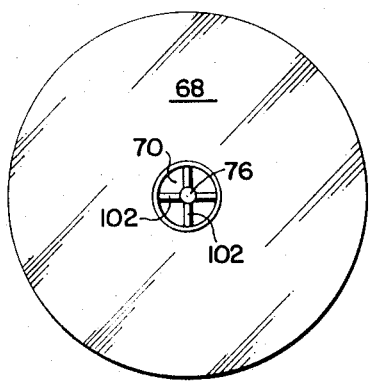
FIG. 4a is an elevational view of a reel.

As best shown in FIG. 4a, take-up reel includes four recesses 102 symmetrically disposed about opening 76 in the interior surface of top flange 66. The function of recesses 102 is to receive the four detents 92 associated with locking device 88 (see FIG. 2) for coupling reel 28 to device 88 which is in turn keyed to mounting post 78 thereby locking reel 26 to prevent its rotation.

As best shown in FIG 2, spring 100 urges locking device 88 toward its locking position wherein detents 92 extend into recesses 102 and protrusion 96 extends into reel opening 76. It will be noted that reel 26 may not rotate more than one quarter of a revolution before detents 92 enter recesses 102.

In order to unlock reel 28, reel locking device 88 is axially displaced downwardly, against the bias of spring 100, such that it assumes the unlocking position shown in FIG. 3 wherein device 88 is retracted into post 78 and detents 92 are withdrawn from recesses 102. With device 88 located in the unlocking position, reel 26 is free to rotate about post 78. Thus cassette 10 is provided with a reel locking device 88 which is coaxially disposed with reel 26 and reel bearing 28 and is mounted for axial displacement relative to reel 26 and bearing 28 from a first or locking position wherein the device 88 arrests the rotation of reel 26 relative to bearing 28 to second or unlocking position wherein device 88 permits the rotation of reel 26.

In the preferred embodiment, locking device 88 is configured to be moved from its normal locking position to its unlocking position by an externally mounted force applying member. The external means for moving or actuating the locking device 88 may take the form of a actuating pin 104 which advantageously may be carried or integrally formed with a reel drive shaft 106 mounted in the camera or projector.

As best shown in FIG. 2, drive shaft 106 includes a fluted section 108 at its lower end which is adapted to mate with the reel drive shaft coupling fluted bore 74 for keying drive shaft 106 to reel 26. Actuating pin 104 is coaxially disposed with and extends beyond the end of shaft 106 such that it may extend through reel opening 76 for engaging locking device protrusion 96.

As cassette 10 is located at its operative position within the camera and projector and shaft 106 engages coupling 72, pin 104 depresses locking device 88 such that it is axially displaced from the locking position to the unlocking position against the bias of spring 100. In response to withdrawing shaft 106 from coupling 72 pin 104 is disengaged from device 88 and spring 100 causes locking device 88 to automatically return to the locking position.

It should be noted that the inverted V-shape of detents 92 and the bias of spring 100 cause locking device 88 to act like a ratchet such that reel 28 may be manually turned to override the reel locking system when cassette 10 is not operatively positioned in either the camera or projector. This feature is especially useful when it is desired to withdraw a loop of film strip 30 from the housing 12 through opening 22 for editing purposes.

While the discussion thus far has been directed toward a reel locking system for take-up reel 26, it will be understood that cassette 10 is also provided with an identical reel locking system for supply reel 24.

A motion picture camera with which cassette 10 is adapted to be used to expose film strip 30 is shown generally at 110 in FIG. 6. Camera 110 includes a housing 112, means defining a chamber 114 in housing 112, which is accessible by opening door 116, for receiving and supporting cassette 10 at an operative position therein; exposure means including a lens 118 and a shutter mechanism (not shown); film transparent means including a claw mechanism (not shown); take-up reel drive means 120 including a drive shaft 106 having a reel locking device actuating pin 104 associated therewith, and supply reel locking device actuating pin 124 which may be carried by a fixed locating shaft 126.

It will be noted that in the preferred embodiment take-up reel 26 is driven to collect the advancing film strip 30 while supply reel 20 is free to rotate in response to the film strip being drawn therefrom. Therfore, shaft 126 is not a drive shaft but serves to position actuating pin 124 in alignment with opening 76 in supply reel 24.

As can be seen in FIG. 6 shaft 126 has a smaller diameter than take-up reel drive shaft 106 and may extend into but not engage supply reel coupling member 72 thereby serving as a locating device for facilitating the positioning of cassette 10 within camera 110. One skilled in the art will recognize that shaft 126 is not essential to the practice of the instant invention and may be eliminated as long as a supply reel actuating pin 124 is provided in chamber 114.

In operation, cassette 10 is inserted into chamber 114 with opening 22 in peripheral wall 20 facing forwardly towards lens 118. Take-up reel actuating pin 104 and supply reel actuating pin 124 extend through the reel openings 76 and axially displace the reel locking devices 88 from the locking position of FIG. 2 to the unlocking position of FIG. 3 as the fluted end 108 of take-up reel drive shaft 106 is inserted into the fluted bore 74 of coupling member 72. Cassette 10 is thereby located at its operative position within camera 110 and is in operative association therewith and door 116 may be closed.

Film exposure is accomplished by actuating a battery powered motor (not shown) within the camera which is adapted to drive the claw mechanism, shutter, and take-up reel drive shaft 106. The claw mechanism engages the sprocket holes in film strip 30 and progressively transports incremental sections thereof past opening 22 for exposure to image bearing light provided by lens 118. After the film strip 30 proceeds past opening 22, it passes around roller 28 and is wound onto the counterclockwise rotating take-up reel 26.

Roller 38 may be configured to have its rotation selectively arrested by a mechanism in camera 110 thereby providing "snubbing action". Also roller 34 may be resiliently mounted for reciprocating movement between an initial position and an energized position for continuously forming a feed loop of film strip between supply reel 24 and opening 22 to isolate that portion of the film strip 30 near opening 22 from the inertial drag of supply reel 24.

Upon withdrawing cassette 10 from camera 110, actuating pins 104 and 124 are disengaged from reel locking devices and springs 100 automatically move them back to the locking position.

Figure 7:
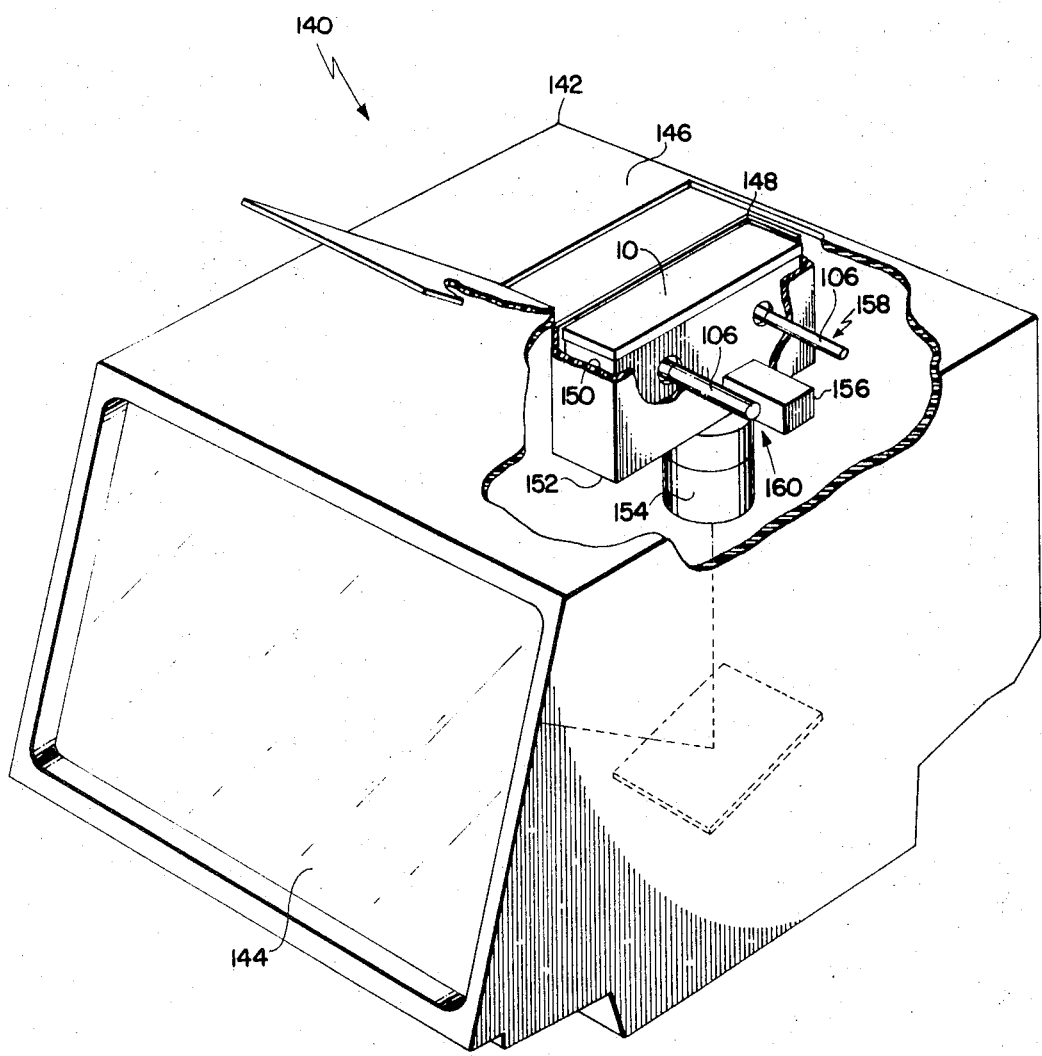
FIG. 7 is a perspective view, partly in section, of a motion picture projector showing a multi-purpose film handling cassette located at an operative position therein.

After exposing film strip 30, cassette 10 may be transferred to a projector or viewer, preferably of the type shown in FIG. 7 at 140, for film processing and projection.

Viewer 140 includes a box-like housing 142 formed in part by a rear projection screen 144. It will be understood that while viewer 140 includes a self-contained projection screen, cassette 10 is also suitable for use with a more conventional type of projector which is adapted to project images onto a remote viewing screen.

Located in a top wall 146 of housing 142 is an elongated rectangular access slot 148 communicating with a substantially parallelepiped shaped open-ended chamber 150 for receiving and supporting cassette 10 at an operative position within viewer 140. Cassette 10 is adapted to be inserted through access slot 148 with opening 22 facing a bottom wall 152 of chamber 150.

Suitable projection means including a lens 154, a rotary shutter, and claw mechanism (neither of which is shown) are mounted below chamber 150 so as to be aligned with opening 22 when cassette 10 is fully inserted in chamber 150.

A projection lamp housing 156 is positioned adjacent chamber 150 such that a projection lamp therein is aligned with the light-receiving face 48 of prismatic lens 46. Light rays from the lamp pass through lens 46, an incremental section of film strip 30, opening 22 and then through lens 154 to a mirror 157 which is angularly disposed to reflect the light rays to the rear of projection screen 144.

Viewer 140 is also provided with supply reel drive means 158 and take-up reel drive means 160. Each of these drive means includes a drive shaft 106 which is coupled to a suitable motor (not shown). Each of the drive shafts 106 includes an integrally formed actuating pin 104 coaxially disposed with and extending outwardly from the end of shaft 106 and a fluted section 108 for engaging the fluted base 74 of reel couplings 72 (see FIG. 2).

In operation, cassette 10 is located at its operative position within the receiving chamber 150 of viewer 140. The supply and take-up reel drive shafts 106 are then axially displaced toward the reels 24 and 26 by means within the viewer (not shown) such that actuating pins 104 extend through reel openings 76 and axially displace reel locking devices 88 from their locking positions to their unlocking positions and fluted sections 108 are in driving engagement with couplings 72. Thus real lockings 88 are moved from the locking position to the unlocking position in response to placing cassette 10 in operative association with viewer 140.

The normally inoperative processing fluid dispenser 40 is rendered operative by means with viewer 140 (not shown) and supply reel drive means 158 is actuated to rewind film strip 30 from take-up reel 26 to supply reel 24. As the emulsion side 32 of film strip 30 passes the applicator end 42 of dispenser 40, it is coated with a thin layer of liquid processing composition to initiate the diffusion transfer process. During this processing cycle, an air blower (not shown) may blow air into cassette housing 12 through air inlet 58 to enhance film drying. It will be noted that air outlet 60 is advantageously aligned with viewer access slot 148 such that the air may be discharged therethrough from the cassette to the exterior of viewer 140.

Shortly after the processing cycle, the developed film strip 30 may be transported between prismatic lens 46 and cassette opening 22 for projection. To initiate the projection cycle, the project lamp is turned on to illuminate prismatic lens 46, the claw mechanism is activated for progressively transporting incremental sections of film strip 30 past opening 22 and prismatic lens 46, and take-up reel drive means 160 is rendered operative for rotating take-up reel 26 in a counterclockwise direction (as viewed in FIG. 1) to collect the advancing film strip. Like camera 110, viewer 140 may slso include a mechanism for selectively arresting the rotation of roller 38 to provide "snubbing action".

Advantageously, air may also be blown through cassette 10 during the projection cycle to cool prismatic lens 46. As the air flows over a portion of lens 46, it is heated thereby and serves to remove any remaining moisture in the developed film strip 30.

At the end of the projection cycle, film strip 30 is preferably rewound onto supply reel 24. In response to withdrawing shafts 106 from reel couplings 72, actuating pins 104 are disengaged from reel locking devices 88 which automatically return to their respective locking positions under the influence of springs 100.

For an example of a projector or viewer suitable for use in connection with the present invention, reference may be had to copending application Ser. No. 174,375, filed on Aug. 24, 1971 by Edwin H. Land and assigned to the same assignee as the present invention.

An alternative embodiment of the instant invention is shown in FIG 5. In this embodiment, a reel locking device 200 is operatively associated with a reel 202 and is spring biased towards the locking position wherein it engages detents 204 formed with the interior surface of cassette side wall 206.

Reel 202 is rotatably mounted on a reel bearing or mounting post 208 having an open central bore 210. In a preferred embodiment, post 208 may be integrally formed with cassette side wall 212.

The hub section 214 of reel 202 includes an annular bearing sleeve 216 suitable dimensioned such that a central section 218 of reel 202 is coaxially disposed with and extends into the open central bore 210 of mounting post 208. The central section 218 of reel 202 includes a central open bore 220 which is preferably square in cross-section.

Locking device 200 includes a circular head section 222 and a centrally disposed square shaft 224 depending therefrom. Symmetrically disposed at the periphery of head section 222 are four recesses 226. Head section 222 also includes dome-shaped section 228 having a pair of crossed drive shaft coupling slots 230 therein.

As best shown in FIG 5, the locking device square shaft 224 is positioned within the square bore 220 of reel section 218 thereby keying the locking device 200 to reel 202 such that it may be axially displaced but not permitted to rotate relative to the reel hub section 214. A coil spring 232 positioned between head section 222 and reel section 218 serves to urge locking device 200 upwardly toward its locking position wherein four detents 204 formed in side wall 206 extend into recesses 226 to lock the reel 202. Detents 204 may take the form of V-shaped projections to provide the manual override feature discussed earlier.

To unlock reel 202, locking device 200 is depressed or axially displaced towards cassette side wall 212. As in the previous embodiment, the actuating means for moving locking device from the locking position to the unlocking position may take the form of reel drive or locating shafts 234 mounted in the camera and projector. Shafts 234 are configured to engage coupling slots 230 and depress locking devices 200 in response to operatively associating cassette 10 with the camera or viewer thereby causing the recesses 226 to be disengaged from detents 204 to permit rotation of reel 202.

As in the previous embodiment, spring 232 automatically moves the locking device 200 back to its locking position in response to withdrawing the cassette from the camera or disengaging the supply and take-up reel drive shafts of the viewer.

In summary, a film handling system has been provided which features a multi-purpose film handling cassette including locking devices for arresting the rotation of supply and take-up reels therein when the cassette is not operatively associated with a camera or projector. Most conveniently, the reels may be automatically unlocked in response to operatively associating the cassette with the camera or projector and thereafter automatically locked again in response to disassociating the cassette therefrom.

In one embodiment, the reel locking devices are operatively associated with reel bearings. In another embodiment, they are operatively associated with the reels. Advantageously, the reel locking devices are coaxially disposed with the reels and their respective bearings so as to occupy a minimum amount of space within the cassette.

Also a motion picture camera and projector have been provided which include reel locking device actuating members carried by reel drive or locating shafts for moving the reel locking devices from their normal locking position to their unlocking positions in response operatively associating the actuating members with the reel locking devices.

Since certain changes may be made in the above film handling system without departing from the scope of the invention herein involved, it is intended that all matter contained in the above description or shown in the accompanying drawings shall be interpreted as illustrative and not in a limiting sense.

What is claimed is:

1. A film handling cassette for use with a motion picture camera and projector of the types including at least one drive shaft having means thereon for engaging and rotatably driving a reel and an actuating pin coaxially mounted to the end of the drive shaft for actuating a reel locking device associated with said cassette, said cassette comprising:

a housing;

means within said housing for mounting a reel for rotation about an axis, said mounting means including a mounting post having a fluted central bore which is coaxially disposed with said axis;

a reel adapted to be mounted on said mounting post for rotation about said axis, said reel comprising first and second opposed flanges spaced from one another by an integral hub section, said hub section having an open central bore for receiving said mounting post, said second reel flange having a bottom central opening therein coextensive and coaxially disposed with said open bore and through which said mounting post may be received in said open bore, said reel further including a top central opening in said first flange, said top opening being coaxially disposed with but substantially smaller than said open bore in said hub section;

drive shaft coupling means on an exterior surface of said first flange for coupling said reel to the drive means on the drive shaft, said coupling means being coaxially disposed with said top opening in said first flange;

means defining at least one recess in an interior surface of said first flange, said recess being disposed over a portion of said open bore;

reel locking means including a reel locking member having a detent thereon, said member being mounted in said fluted bore of said mounting post for movement along said axis between a first position wherein said detent enters said recess in said interior surface of said first flange for arresting rotation of said reel about said axis and a second position wherein said detent is retracted from said recess to allow rotation of said reel about said axis, said member having a shape conforming to that of said fluted bore to prevent rotation of said member about said axis; and biasing means for urging said reel locking member towards said first position and allowing said member to be moved to said second position by the actuating pin on the drive shaft which is adapted to extend through said top opening in said first reel flange and move said member to said second position in response to operatively coupling the drive means on the drive shaft to said drive shaft coupling means on said exterior surface of said first reel flange.

2. A film handling cassette as defined in claim 1 wherein said biasing means is configured to urge said reel locking member to said first position in response to disassociating the drive shaft from said reel.

3. A film handling cassette as defined in claim 1 wherein said reel is a take-up reel and said cassette further includes a supply reel which is identical to said take-up reel, a second mounting post for mounting said supply reel for rotation about a second axis which is substantially parallel to said axis, and second reel locking means and biasing means mounted in said second mounting post.

4. A film handling cassette as defined in claim 3 further including a photographic film strip coupled between said supply and take-up reels, an exposure and projection station past which incremental sections of said film strip are adapted to be advanced for exposure and projection and a processing station for treating said film strip with a fluid processing composition.

* * * * *